June 24, 1958
R. L. HARDY
2,839,834
PRECISION PENDULUM-ACTUATED VERTICAL
ARC OR CIRCLE FOR VERTICAL ANGLE
MEASURING INSTRUMENTS
Filed Feb. 19, 1954
2 Sheets-Sheet 1
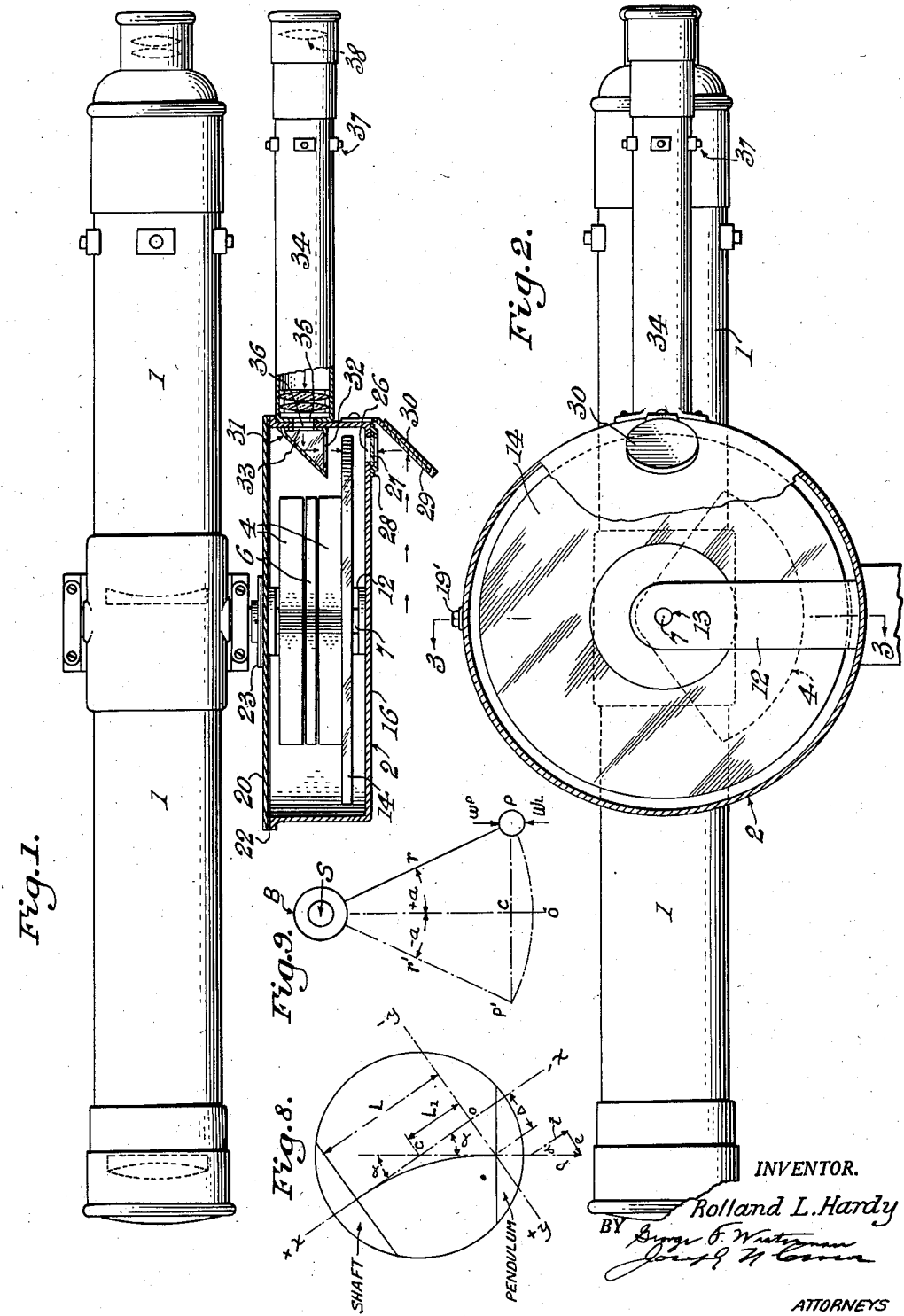
INVENTOR.
Rolland L. Hardy
BY
ATTORNEYS

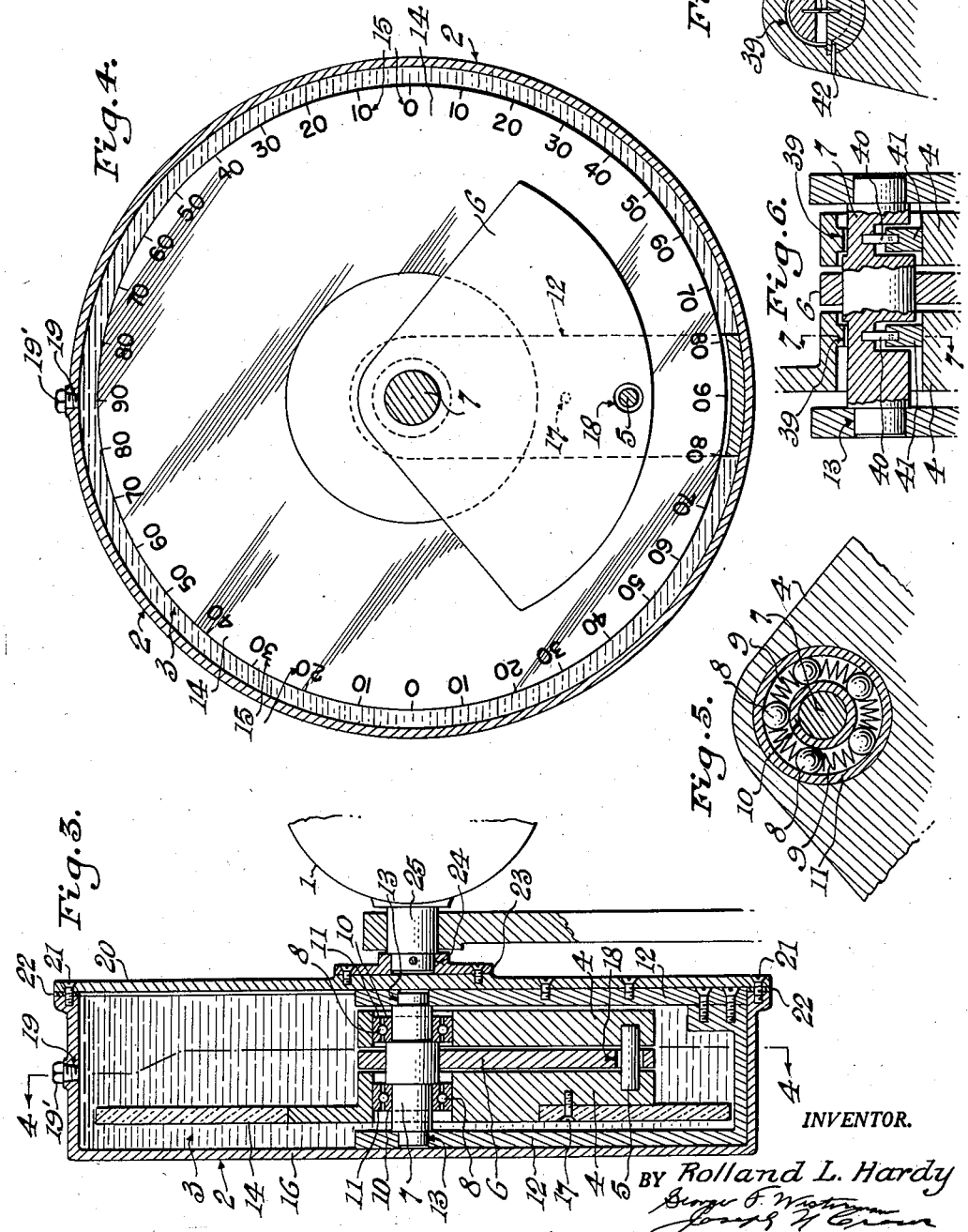

United States Patent Office 2,839,834
Patented June 24, 1958

2,839,834

PRECISION PENDULUM-ACTUATED VERTICAL ARC OR CIRCLE FOR VERTICAL ANGLE MEASURING INSTRUMENTS

Rolland L. Hardy, Springfield, Va.

Application February 19, 1954, Serial No. 411,596

10 Claims. (Cl. 33—70)

(Granted under Title 35, U. S. Code (1952), sec. 266)

The invention described herein may be manufactured and used by or for the Government for governmental purposes, without payment to me of any royalty thereon.

The present invention relates to measuring instruments and more particularly to an improvement for instruments used for measuring vertical angles. When using instruments such as transits, theodolites, and plane table alidades, it is necessary to first adjust the vertical circle by means of an auxiliary control level bubble and tangent screw to a previously adjusted horizontal or vertical reference line. Such adjustment may utilize as much as 25% to 50% of an operator's time, particularly when reading vertical angles with a plane table alidade.

It is therefore a principal object of the present invention to provide an improvement for instruments for measuring vertical angles which will improve the accuracy thereof and materially reduce the time required for adjustment of such instruments when taking readings.

It is a further object of the present invention to provide an improvement for vertical angle measuring instruments which absorbs the major portion of the torque transmitted to the shaft mounting the vertical circle by the rotating elements of the instrument to increase the accuracy thereof.

It is another object of the present invention to provide an improvement for vertical angle measuring instruments which will maintain an axis through the center of the vertical circle in a truly horizontal plane without benefit of the conventional bubble level and tangent screw arrangement.

It is another object of the present invention to provide an improvement for the vertical circle support structure for vertical angle measuring instruments to increase the accuracy thereof and reduce the time for reading vertical angles which is independent of the main shaft of the instrument to minimize the torque transmitted by the rotating elements of the instrument to the vertical circle support structure.

It is a further object of the present invention to provide in a vertical angle measuring instrument a double hung non-eccentric pendulum structure associated with the main shaft of the instrument, in a fluid tight inclosure containing a transparent damping fluid, to support and counterbalance the vertical circle of the instrument and to absorb the torque transmitted by the rotating elements of the instrument to the main shaft, thereby improving the accuracy thereof and reducing the time required to take readings.

It is a further object of the present invention to provide a pendulum compensating structure for vertical angle measuring instruments supported in a manner to materially increase the accuracy of such instruments.

It is a further object of the instant invention to provide in vertical angle measuring instruments compensating structure based on principles of multiple phase torque minimization to increase the accuracy of such instruments.

These and other objects will be more readily understood by reference to the drawings wherein—

Fig. 1 is a plan view, partly in section, showing the vertical circle structure of the invention mounted on the main telescope of a vertical angle measuring instrument;

Fig. 2 is an elevational view of the vertical circle structure, partly in section, and associated telescope;

Fig. 3 is a sectional view taken on the line 3—3 of Fig. 2;

Fig. 4 is a sectional view taken on the line 4—4 of Fig. 3;

Fig. 5 is a detailed sectional view of the ball-bearing mounting of the segmented pendulum shown in Fig. 3;

Fig. 6 is a detailed sectional view showing a modified form of mounting for the segmented pendulum associated with the vertical circle;

Fig. 7 is a view taken on the line 7—7 of Fig. 6;

Fig. 8 shows the factors considered to demonstrate mathematically that a thin wire or leaf spring when substituted for the ball bearings as a support for the segmented pendulum and subjected to a small amount of bending does not shift the position of the supported pendulum; and Fig. 9 shows the factors considered to demonstrate the effect friction will have on a shaft supporting a simple pendulum to reduce the theoretical length of arc traveled by the pendulum.

In replacing the bubble level and tangent screw in vertical angle measuring instruments by a pendulum, structure errors due to friction in the instrument main shaft bearing as well as errors existing in the means used to make the measurements, will be introduced in vertical angle measurements. The combined probable error can be determined mathematically and thus permit greater accuracy to be obtained in such devices by controlling the rotation of the main shaft so that it does not exceed the small angular limit required for the proper functioning of the bearings or alternate means supporting the pendulum on the main shaft of the instrument.

It is to be understood that alternate means in place of the ball bearings of the instant invention may be used to support the segmented pendulum such as a knife edge and bearings other than ball bearings. In any case, the bearings are of a type which by their nature are the most sensitive but which are impractical for precise use with supports which are rotated more than a few minutes of arc relative to a pendulum axis, or which, as in the case of spring retained ball bearings and similar bearings that may rotate through 360°, are nevertheless most sensitive when rotation is closely restricted relative to a pendulum axis.

In order to develop the mathematical determination of the probable error above referred to, reference is made to Fig. 9 where S represents a shaft rotating through any angle and stopping at any random position relative to the bearing B. Let $r$ be a weightless rigid arm connecting the bearing B with the pendulum P. Let $W_p$ be the weight of the pendulum acting vertically downward through the center of gravity of P and $W_L$ be the buoyant force acting vertically upward when P is suspended in liquid. Let $r'$ and P′ represent the symmetrically opposite positions of the rigid arm and pendulum with relation to the vertical line SO. Let P′OP represent the arc through which P travels and the point C represent the right angle intersection of the chord P′P and the vertical line SO.

It is apparent that rotation of the shaft S will initially deflect the pendulum P from its normal position at O to some position P or P′. The arm $r$ or $r'$ will thus form some angle $\pm a$ with relation to the vertical line SO. The maximum value of $\pm a$ obviously depends on the amount of friction existing between the shaft S and the bearing B. Initially there is no relative motion between S and B but this condition ceases when the moment (torque) developed by the pendulum P in its deflected position overcomes the opposing moment caused by the buoyant force $W_L$ and the breakaway moment $M_b$ of the bearing. Therefore, $a$ is maximum when:

(1) $$(W_p.CP)-(W_L.CP)=M_b$$

This may also be expressed as:

(2) $$(W_p-W_L)CP=M_b$$

Or:

(3) $$CP=\frac{M_b}{(W_p-W_L)}$$

When this position of instantaneous equilibrium is reached static friction ceases to exist momentarily, and rolling or sliding friction of less magnitude allows the pendulum P to swing to some position on the opposite side of the vertical line SO. For sensitive bearings this position is very near the positions P or P'. Because static friction exists at this point (relative motion of shaft and bearing being zero) and the deflected position of P is not adequate to develop the moment necessary to overcome the breakaway moment of the bearing, the pendulum P will remain at rest in this position (neglecting continuing rotation of the shaft or vibrational effects). Continued rotation of the shaft S will again deflect the pendulum an angle of $\pm a$ and repeat the cycle any number of times. Considering the accidental direction of rotation of the shaft and of the facts that rotation may stop at any instant and at any random position, it is assumed (neglecting vibration) that the possible final positions of the pendulum P are evenly distributed along the arc P'OP. By the theory of errors then, the probable angular deflection of the pendulum P is $\pm \frac{1}{2}a$. If angle $a$ is expressed in seconds as a function of the arc (OP), then:

(4) $$a=\text{arc } OP \text{ (in inches)} \div \frac{\text{Circumference of circle (in inches)}}{\text{Seconds in a circle}}$$

Or:

(5) $$a=\frac{1,296,000(OP)}{2\pi r}$$

For the small angles of $a$ that occur with a sensitive pendulum the difference between the length of the lever arm CP and the length of the arc OP is negligible, therefore we may say:

(6) $$a=\frac{1,296,000(CP)}{2\pi r}$$

By the substitution of the equivalent value for CP from Equation 3 into Equation 6 above:

(7) $$a=\frac{1,296,000(M_b)}{(W_p-W_L)(2\pi r)}=\frac{648,000(M_b)}{(W_p-W_L)\pi r}$$

Or:

(8) $$\text{probable deflection } \tfrac{1}{2}a=\frac{103,000 M_b}{(W_p-W_L)r}$$

In an angle measuring device utilizing the pendulum for a vertical line of reference the combined probable error A of a single measurement will consist of the summation of the probable angular deflection of the pendulum $\frac{1}{2}a$ and the other accidental errors $k$ existing in the means used to make the measurement.

Therefore, in accordance with the principle of "least squares," the probable error of a single observation or reading is:

(9) $$A=\sqrt{(\tfrac{1}{2}a)^2+k^2}$$

And by substitution of the equivalent value for $\frac{1}{2}a$ from Equation 8 into Equation 9 above:

(10) $$A=\sqrt{\left(\frac{103,000 M_b}{(W_p-W_L)r}\right)^2+k^2}$$

In which:

$A$=accuracy of angle measurement expressed in seconds of arc, as the combined probable error of a single observation $M_b$=breakaway moment of bearing expressed in inch ounces $r$=radius from center of bearing to center of gravity of pendulum in inches $W_p$=weight of pendulum in ounces $W_L$=weight of liquid in ounces displaced by the pendulum $k$=probable error in seconds of arc, existing in the means used to make the measurement (reading error)

Depending upon their magnitude, exterior vibrational effects will either increase or decrease the probable deflection $\frac{1}{2}a$ of the pendulum's vertical axis from a truly vertical line. Exterior impacts or vibrations inducing pendulum oscillations greater than the sum of the angles $-a$ and $+a$ after the supporting shaft has ceased to rotate, that are not followed by induced oscillations of less magnitude will tend to increase the probable deflection to a value greater than $\frac{1}{2}a$. Obviously, however, the probable deflection cannot be increased to a value greater than $a$, unless the instrument is damaged. On the other hand, exterior impacts or vibration inducing an initial oscillation of less than $a$ ($\frac{1}{2}a$ on each side) will normally reduce the probable deflection accordingly. In the design of a damping system, liquid or otherwise, an important consideration is the reduction of normal vibrational effects (if any) by cushioning, so that the induced angular deflection is initially less than $\frac{1}{2}a$ after the rotation of the shaft has stopped. Therefore the constant of 103,000 appearing in Equation 10 above is considered to be a conservative design value.

It has been determined by experiment that the breakaway moment of spring retained ball bearings is considerably less when rotation of the bearing relative to its support is closely restricted. By holding all factors except accuracy and breakaway moment constant, the accuracy of pendulum-measured vertical angles when rotation was limited to about $\frac{1}{2}°$ on each side of the vertical was determined to be approximately three times as precise as pendulum-measured vertical angles when rotation of the bearing was unlimited (20 seconds and 60 seconds respectively, single observation probable error, determined by 25 observations of each with identical conditions of test except restricted angles in one case). The increased accuracy of the restricted rotation procedure is obviously due to a difference in the average breakaway moment of the bearing for the two conditions of test. This can theoretically be attributed to an assumption that with unrestricted rotation of the spring retained ball bearings (which are among the best known for minimum starting torque or breakaway moment) the steel balls are more likely to be unevenly spaced, and the spring retainers more likely to be severely compressed in one portion of the race, as compared with the same bearing of restricted rotation. Therefore it is deduced that the difference in breakaway moment is due to sliding friction of the balls and greater spring compression resistance in one case, and to rolling friction of the balls and comparatively light spring compression resistance in the other. This action is analogous in effect, though not in principle, to the great sensitivity of such other pendulum supports as knife edges or fine wires, wherein sensitivity decreases with the tilt or rotation of the support to a point where the pendulum is no longer of practical use.

These facts suggest a principle of design, wherein one pendulum segment is used to approximately level the support for another, which by its nature and greater sensitivity provides for more accurate measurement of unlimited vertical angles in a pendulum-actuated instrument with a rotating support than has heretofore been possible. Application of the above derived design formulae and other known principles of theoretical and applied mechanics to the design of each segment of such a pendulum arrangement will result in maximum attainable accuracy consistent with given materials, weight, and space.

Reference is now made to Fig. 1 showing one embodiment of the invention wherein the device of the instant invention is attached to a conventional telescope 1 of an instrument used to measure vertical angles. It is to be understood that while a telescope for a surveying instrument has been illustrated, the principle of the device of the instant invention may be applied to other instruments used for measuring vertical angles. Essentially, the device comprises an outer liquid-tight cylindrical casing 2 containing a transparent lubricating fluid 3 and a double hung non-eccentric pendulum structure wherein the pendulum is directly attached to the bearing, having portions 4 joined by a pin 5 and a portion 6 sandwiched between the segmental portions 4. The portions 4 are supported from the pendulum shaft 7 for free rotation by means of ball bearings 8 retained by springs 9 enclosed in a raceway formed by inner and outer members 10 and 11, respectively concentric with shaft 7. The central portion 6 is fixedly secured to the shaft 7. Arranged within the casing 2 is a U-shaped member 12 having apertures 13 which serve as bearings to support the shaft 7. A vertical circle 14 of transparent material unaffected by the fluid 3, having indicia 15 calibrated in degrees in any convenient manner, is secured as at 17 to the outermost side of a portion 4 of the segmental pendulum which is adjacent the outer wall 16 of the casing 2. The central portion 6 of the pendulum is provided with an aperture 18 adjacent the periphery thereof of greater diameter than that of the pin 5, the difference in diameters being such that all needless rotation of the segments 4 relative to the central portion 6 is eliminated. When the entire pendulum is at rest, there is no contact between the hole and the pin. The casing 2 is provided with a filler opening 19 which is sealed by a plug 19' and with a closure cover 20 secured to the casing 2 by bolts 21 or other convenient means in liquid tight relation by gasket 22. A mounting plate 23, having a central aperture 24, is concentrically secured to the closure cover 20 and facilitates mounting the device and securing in any convenient manner on the main horizontal shaft 25 of a vertical angle measuring instrument. The outer wall 16 of the casing 2 is provided with an aperture 26 adjacent the periphery thereof which is covered by a transparent material 27 held in place by a frame 28 secured to the casing 2 in any convenient manner. Light is directed through the aperture 26 by the reflecting surface 29 supported in a frame 30 secured to the casing 2 in a suitable manner. A triangularly shaped light reflecting structure 31 is secured internally of the casing 2 adjacent the aperture 26. Two perpendicular sides of the triangular structure 31 are provided with apertures 32 and 33, and the remaining side is treated on its exterior surface in any well known manner which will yield a reflective surface facing internally of the triangular structure 31. The latter structure is so located internally of the casing 2 as to cooperate with the reflecting surface 29 which directs light through the aperture 26 and transparent vertical scale 14 to permit viewing the indicia 15 on the vertical scale 14 by an externally mounted microscope 34 of conventional design. The microscope 34 is mounted on the casing 2 in any suitable manner so that the objective lens opening 35, aperture 36 in the casing 2 and aperture 33 of the triangular structure 31 are in registering relation. Inasmuch as the device is intended to be rigidly attached to the main shaft 25 of the vertical angle measuring instrument by means of the mounting plate 23 as previously described, the pendulum shaft 7 will experience slight rotation due to friction in the bearings 13 when the telescope 1 and attached casing 2 are rotated about their respective horizontal axes. The bearings 13 being less sensitive than the ball bearings 8 causes a majority of the torque transmitted to pendulum shaft 7, due to friction in bearings 13, to be applied to the central pendulum portion 6 which is rigidly attached to the shaft 7. The deflection of the central portion 6 and consequently the rotation of the shaft 7 can be controlled so that it does not exceed the small angular limit required for the proper functioning of the ball bearings 8 or alternate means of support as previously mentioned by application of the principles above, particularly Equation 8, in determining the probable error of a single observation. The difference between the diameters of the pin 5 and aperture 18 can be fixed so that all needless rotation of the segmental portions 4 relative to the central portion 6 can be eliminated. The net effect of the simultaneous action of the pendulum portions is that the central portion 6 absorbs the effect of torque transmitted by the rotating elements of the assembly and at the same time maintains the pendulum shaft 7 in a position for the proper functioning of the ball bearings 8 and the segmented pendulum portions 4 upon which the vertical circle 14 is mounted. The segmented portions 4 being undisturbed by the torque transmitted to central portion 6 maintain the horizontal or vertical reference line of the vertical circle 14 in the correspondingly truly horizontal or vertical plane, within extremely close limits as determined by the application of Equation 10, previously mentioned. Therefore, vertical angles resulting from the rotation of the telescope 1 about its horizontal axis of support relative to the horizontal or vertical reference lines of the vertical circle 14, may be read directly through the reading microscope 34 which is equipped with an adjustable reading reticle 37 located in the focal plane of the eye lens 38.

Fig. 6 shows another embodiment of the invention wherein a thin wire or leaf spring 40 supports the segmented portions 4 on the pendulum shaft 7 in a double phase bearing structure wherein the pendulum is attached to a flexible wire or leaf spring which is in turn secured to the pendulum shaft 7.

The following mathematical analysis is presented to prove that when a wire or leaf spring is used to support a pendulum, as in the instant invention, the small amount of bending that may exist when the pendulum shaft 7 is rotated by torque transmitted due to rotation of instrument elements as described above, does not shift the position of the supported pendulum because of the limited strength of the wire or spring and because part of the wire or spring is above the center of rotation for the segmental portions 4. Fig. 8 illustrates an exaggerated concept of a leaf spring or wire supporting a pendulum, as in the instant invention, when the shaft 7 is in a slightly rotated position due to the position of the central portion 6 and the segmental portions 4 are in a truly vertical position. This slightly rotated position is compensated for by applying well known principles of mechanics of materials to determine the dimensional characteristics of the wire or leaf spring of the novel structure of the instant invention so that with the probable deflection of the shaft 7, the slope of the lower end of the spring or wire is infinite (vertical), and tangents to the curve thereby formed at both ends of the spring or wire pass through the center of rotation of the segmented portions 4. Thus, the axes of the segmental portions 4 supporting the vertical circle 14 are both truly vertical and non-eccentric.

In developing the mathematical analysis, the leaf spring or wire may be treated as a cantilever beam fixed at its upper shaft end and sloping relative to a vertical line at a very small angle $\alpha$ as shown in Fig. 8. The free end of the beam, lower or pendulum end, is subjected to a vertical load $P$ representing the weight of the pendulum whose component $p$ normal to the $x$—$x$ axis in Fig. 8, is equal to $P \sin \alpha$. A tensile component $t$ also exists which acts parallel to the undeflected axis of the beam and is equal to $P \cos \alpha$. The total free length of the cantilever spring or wire is represented by L and $L_1$ represents the portion of its length located below the center of rotation c, which latter is coincident with the center of the shaft as in Fig. 8, or 7 in the remaining structural figures. The deflection of the spring or wire is represented by $\Delta$. Using the coordinate axes ($x$, $-x$ and $y$, $-y$) established and the general equation for the elastic curve of beams, expressed in terms of the bending moment M, where (1) $$M = \pm EI \frac{d^2y}{dx^2}$$

it is possible to determine the portion of the total length of the leaf spring or wire which must be positioned below the center of rotation of the upper end of the support so that the lower end of the leaf spring or wire is non-eccentric with respect to a vertical line passing through the center of rotation.

The moment M at any cross-section of the deflected beam is (2) $$M = \rho x - t(\Delta - y)$$

in which the term $t(\Delta - y)$ is a linear reduction of $\rho x$ in the proportion that the final deflection is less than the deflection computed for $\rho x$ alone. The term $t(\Delta - y)$ is equivalent to some expression for moment in terms of $x$ in which the coefficient is smaller than $\rho$. This is true because this component of moment does not bend the beam, but tends to return the beam toward its former straightness. This expression of moment may be stated as (3) $$\rho' x = t(\Delta - y)$$

in which $\rho'$ is a symbol for the unknown coefficient that is smaller than $\rho$. This is an expression in $x$ and $y$ that should be true for all values of $x$ and $y$. When $x = L$, $y = 0$ and substituting in Equation 3 yields (4) $$\rho' L = t\Delta \text{ or } \rho' = t\frac{\Delta}{L}$$

Since the coefficient as derived includes the component $t$, the use of $\rho'$ may be dropped and the coefficient expressed as $ct$ in which $c$ is an expression for $$\frac{\Delta}{L}$$

The moment M at any cross-section of the deflected beam can be expressed as, from Equations 2 and 3

$$M = \rho x - \rho' x$$

or $$M = \rho x - ctx$$

which when factored yields (5) $$M = (\rho - ct)x$$

Substituting this value for M in Equation 1 results in (6) $$EI \frac{d^2y}{dx^2} = (\rho - ct)x$$

From this, expressions for slope and deflection can be obtained by double integration. The constants of integration are obtained from the fact that both $$\frac{dy}{dx} = 0$$

and $y = 0$ when $x = L$. The resulting expressions are (7) $$\frac{dy}{dx} = \frac{(\rho - ct)x^2}{2EI} - \frac{(\rho - ct)L^2}{2EI}$$

(8) $$y = \frac{(\rho - ct)x^3}{6EI} - \frac{(\rho - ct)L^2}{2EI} + \frac{(\rho - ct)L^3}{3EI}$$

The desired conditions of slope and deflection, that is, that the slope of the free end equals rotation of the fixed end and that deflection of the free end is zero relative to a vertical line through its initial position are satisfied by these expressions:

(9) $$\frac{dy}{dx} = -\tan \alpha \text{ when } x = 0$$

(10) $$y = L_1 \tan \alpha \text{ when } x = 0$$

Substitution, when $x = 0$, of the slope condition from (9); the expressions $P \sin \alpha$ and $P \cos \alpha$ for $\rho$ and $t$ respectively, and $$\frac{L_1 \tan \alpha}{L}$$

for $c$ (note that $y = \Delta$ when $x = 0$ and also that $$c = \frac{\Delta}{L}$$

into Equation 7 produces:

(11) $$-\tan \alpha = -\left[\frac{\left(P \sin \alpha - \frac{L_1 \tan \alpha P \cos \alpha}{L}\right)L^2}{2EI}\right]$$

which simplifies to

(12) $$L^2 = \frac{2EI}{P \cos \alpha} + LL_1$$

Substitution, when $x = 0$, of the deflection condition from (9), the expressions $P \sin \alpha$ and $P \cos$ for $\rho$ and $t$ respectively, and $$\frac{L_1 \tan \alpha}{L}$$

for $c$ into Equation 8 produces:

(13) $$L_1 \tan \alpha = \frac{\left(P \sin \alpha - \frac{L_1 \tan \alpha}{L} \times P \cos \alpha\right)L^3}{3EI}$$

which simplifies to:

(14) $$L_1 = \frac{P \cos \alpha L^3}{3EI} - \frac{P \cos \alpha L_1 L^2}{3EI}$$

Considering small values of $\alpha$, whereby $\cos \alpha = 1$ for all practical purposes, Equations 12 and 14 can be solved simultaneously for L and $L_1$ when E, I, and P are considered to be known.

Assuming a trial and error method of solution and the trial substitutions of $L_1 = \frac{2}{3}L$ in each of Equations 12 and 14 there results:

(15) $$L^2 = \frac{2EI}{P} + \frac{2}{3}L^2$$

(16) $$\frac{2}{3}L = \frac{PL^3}{3EI} - \frac{\frac{2}{3}PL^3}{3EI}$$

In simplified form both Equations 15 and 16 reduce to the same value, proving that $L_1 = \frac{2}{3}L$ was the correct trial value. Therefore, the values for $L_1$ and L are:

(17) $$L_1 = \frac{2}{3}L$$

(18) $$L = \sqrt{\frac{6EI}{P}}$$

The equation in step 18 gives the required length of leaf spring or wire of given material ($E$ = modulus of elasticity) and cross section ($I$ = moment of inertia) supporting a given load P, whose lower end will be truly vertical even though its upper end is supported at a slight inclination. Step 17 shows that $\frac{2}{3}$ of this required length must be positioned below the center of rotation of the upper end of the support so that the lower end of the leaf spring or wire is non-eccentric with respect to a vertical line passing through the center of rotation of the pendulum. In Figs. 6 to 8, $L_1$ appears to be about $\frac{1}{2}$ L, but this is because the illustrated curve is that of a circle whereas the elastic curve of the cantilever lever spring or wire is not. The leaf or wire support has its ends on opposite sides of the center of rotation, and of such length and proportions on each side that small angles of rotation in the upper end of the leaf spring or wire are totally eliminated at the lower end of the leaf spring or wire without displacing the lower end with respect to a vertical line passing through the center of rotation of the pendulum. It is to be understood that the term "required length" referred to in connection with the mathematical derivations is the minimum necessary length of spring or wire whose lower end will be truly vertical although its upper end is supported at a slight inclination. The lower end of a spring that is longer than the minimum necessary length will still be vertical. The length derived in Equation 17 is ⅔ of the required or minimum necessary length expressed in Equation 18 and the remaining ⅓ proportion of the leaf spring is likewise referenced to the required or minimum necessary length. From practical considerations it is difficult to achieve exactly the theoretical results of ⅓ the minimum necessary length above the static center and ⅔ below in an actual instrument assembly since the center of gravity of the assembly assumed to be in a particular fixed position, is likely to vary sufficiently to prevent obtaining the proper proportioning in the lengths above and below the static center or the spring may be longer than required for other conditions existing. The principles of the instant invention are accomplished in practical applications by considering that ⅓ the effective or minimum necessary length should be above the static center. If the actual length of spring is $(L+K)$ units long, where L is the minimum necessary length and K is an arbitrary amount of additional length, proper proportioning is theoretically accomplished by placing ⅓ L above the center and ⅔ $L+K$ below the effective location of the static center. A mechanical determination of the static center location can be made during assembly by shifting parts and observing results until eccentricity effects have been eliminated to the maximum practical extent and at the same time permit the automatic establishment of a precise reference line on a vertical arc or circle relative to the direction of gravity.

There is shown in Figs. 6 and 7 a structure embodying the principles above set forth and in which the remainder of the device is as previously described. The pendulum shaft 7 is supported in the bearings in the U-shaped support as previously described. The segmented portions 4 are supported so as to afford a clearance 39 with the shaft 7 and are free to rotate relative to shaft 7 by leaf springs or wires 40, one end of each of which is embedded or otherwise secured to the shaft 7 and the other ends of which are secured to the segmented portions 4 in any convenient manner. For convenience in assembling the device, the semi-circular parts 41 of the segmented portions 4 are secured to the remaining portions of the pendulum segments by pins 42. The leaf spring or wire supports 40 are proportioned as to length above and below the centers of rotation of the pendulum segments in accordance with the principles previously discussed. While the novel double hung pendulum structure of the instant invention increases the accuracy of conventional vertical angle measuring instruments, the probable error inherent in an instrument of this type may be considerably reduced when the leaf spring or wire bearing suspension is used. The central portion 6 is secured to the pendulum shaft 7 as previously described.

While specific embodiments have been described, it is to be understood that various other adaptations of the principles involved within the scope of this invention may be used without departing from the spirit of this invention.

Having thus described a device which permits more rapid operation of vertical angle measuring instruments and greater accuracy than heretofore obtainable, what I claim as new and desire to secure by United States Letters Patent is:

1. A device for minimizing torque transmitted to a normally horizontally arranged shaft in a vertical angle measuring instrument by rotating elements freely supported by said horizontal shaft comprising a liquid-tight cylindrical casing means fixedly connecting said casing to said horizontal shaft in axial alignment therewith, a central shaft freely mounted within said casing in axial alignment with said horizontal shaft and independently of the latter and said casing, a first pair of mutually spaced sector-shaped members having opposing plane surfaces and eccentrically mounted on said central shaft for free rotation thereon, means joining said pair of segments adjacent the peripheries thereof in registering relation, a second sector-shaped member having opposing plane surfaces and eccentrically rigidly secured to said central shaft in mutually spaced face relation with opposing plane surfaces of said pair of sector shaped members, apertures in said pair of sector shaped members to accommodate said joining means and to limit the motion of said second sector shaped members relative to said pair of sector shaped members, a transparent graduated dial plate mounted on an outer plane surface portion of one of said pair of sector shaped members adjacent a wall of said casing remote from the point of connection to said horizontal shaft, a first aperture in the planar wall of said casing which is remote from the point of connection to said horizontal shaft and adjacent the periphery of said graduated dial plate, a vibration damping medium contained within said casing, means mounted externally on said casing in cooperative relation with said first aperture for directing parallel light rays internally of said casing through said transparent graduated dial plate, an optical system mounted on said casing for observing said graduated dial plate, said first and second sector shaped members maintaining said central shaft and said graduated dial plate in a predetermined position whereby torque transmitted to said central shaft by friction in said central shaft bearing upon movement in a vertical plane of the rotating elements mounted on said horizontal shaft and said externally mounted optical system is opposed by said first and second sector shaped members to maintain said transparent graduated dial plate and said central shaft in a position to accurately measure vertical angles.

2. A device as recited in claim 1 wherein said optical system includes a triangularly shaped member having an opening in each of the perpendicularly disposed sides and mounted internally of said casing in cooperative relation with said first aperture and light directing means to cause said transparent graduated dial plate to be illuminated, a second aperture in said casing located perpendicularly to said first aperture and in registering relation with an opening in said triangularly shaped member, a microscope mounted on the exterior portion of said casing having its optical axis aligned with said second aperture to permit viewing the graduations on said dial plate, said microscope, triangularly shaped member and light directing means being collectively rotated simultaneously with said casing.

3. A device for measuring vertical angles comprising a telescopic sighting means, a support including a horizontal shaft for mounting said telescopic sighting means for free rotation thereon, a liquid-tight cylindrical casing including means on said casing for fixedly securing said horizontal shaft thereto, a central shaft supported within said casing in axial alignment with said horizontal shaft, a first sector-shaped membeer having opposing planar surfaces eccentrically rigidly secured to said central shaft, a pair of similar sector-shaped segments having opposing planar surfaces, each sector-shaped segment mounted on said central shaft by a suspension means for free rotation about said central shaft in mutually spaced relation with one planar surface of said first sector-shaped member, said suspension means including an annular raceway mounted on said central shaft, rolling elements for supporting radial loads arranged in approximately uniformly spaced relation in said raceway by resilient separators located between said rolling elements and in contact therewith to provide minimum starting torque for said pair of sector-shaped segments in opposing torque transmitted to said central shaft on rotation of said telescopic sighting means, means joining said pair of segments adjacent the peripheries thereof in registering relation, an aperture in said first sector-shaped member to accommodate said joining means and to limit the motion of said sector-shaped segments relative to said first sector-shaped member, a transparent graduated dial plate secured to an outer surface of one of said pair of sector-shaped segments adjacent an outer wall of said casing in a predetermined position normal to the axis of said central shaft, means for observing the graduations on said dial plate externally of said casing, a vibration damping medium filling said casing whereby upon simultaneous rotation of said telescopic sighting means and said casing, said first sector-shaped member maintains said central shaft in a predetermined position to permit said sector-shaped segments to maintain said graduated dial plate in a predetermined position to render accurate vertical angle measurements.

4. A device for measuring vertical angles comprising a telescopic sighting means, a support including a horizontal shaft for mounting said telescopic sighting means for free rotation thereon, a liquid-tight cylindrical casing including means on said casing for fixedly securing said horizontal shaft thereto, a central shaft supported within said casing in axial alignment with said horizontal shaft, a first sector-shaped member having opposing planar surfaces eccentrically rigidly secured to said central shaft, a pair of similar sector-shaped segments having opposing planar surfaces, each sector-shaped segment mounted on said central shaft by a suspension means for free rotation about said central shaft in mutually spaced relation with one planar surface of said first sector-shaped member, said suspension means including leaf springs arranged perpendicular to the axis of said central shaft, the plane surfaces of said leaf springs being parallel to the axis of said central shaft and having one end of each of said leaf springs secured to said central shaft and the opposite end of each of said leaf springs secured adjacent the apex of each said sector-shaped segment below the center of rotation thereof, one-third the effective length of each of said leaf springs which extends externally from said central shaft to each segment being above the center of rotation of each segment, means joining said pair of segments adjacent the peripheries thereof in registering relation, an aperture in said first sector-shaped member to accommodate said joining means and to limit the motion of said sector-shaped segments relative to said first sector-shapeed member, a transparent graduated dial plate secured to an outer surface of one of said pair of sector-shaped segments adjacent an outer wall of said casing in a predetermined position normal to the axis of said central shaft, means for observing the graduations on said dial plate externally of said casing, a vibration damping medium filling said casing whereby upon simultaneous rotation of said telescopic sighting means and said casing said first sector-shaped member maintains said central shaft in a predetermined position to permit said sector-shaped segments to maintain said graduated dial plate in a predetermined position to render accurate vertical angle measurements.

5. A device for measuring vertical angles comprising a telescopic sighting means, a support including a horizontal shaft for mounting said telescopic sighting means for free rotation thereon, a liquid-tight cylindrical casing including means on said casing for fixedly securing said horizontal shaft thereto, a central shaft supported within said casing in axial alignment with said horizontal shaft, a first sector-shaped segment having opposing planar surfaces, each sector-shaped segment mounted on said central shaft by a suspension means for free rotation about said central shaft in mutually spaced relation with one planar surface of said first sector-shaped member, said suspension means including flexible wires having one end of each of said wires secured to said central shaft perpendicular to the axis thereof and the opposite end of each of said wires secured adjacent the apex of each sector-shaped segment below the center of rotation thereof, one-third the effective length of each of said wires which extends externally from said central shaft to each segment being above the center of rotation of each segment, means joining said pair of segments adjacent the peripheries thereof in registering relation, an aperture in said first sector-shaped member to accommodate said joining means and to limit the motion of said sector-shaped segments relative to said first sector-shaped member, a transparent graduated dial plate secured to an outer surface of one of said pair of sector-shaped segments adjacent an outer wall of said sealed casings in a predetermined position normal to the axis of said central shaft, means for observing the graduations on said dial plate externally of said casing, a vibration damping medium filling said casing whereby upon simultaneous rotation of said telescopic sighting means and said casing, said first sector-shaped member maintains said central shaft in a predetermined position to permit said sector-shaped segments to maintain said graduated dial plate in a predetermined position to render accurate vertical angle measurements.

6. A device for measuring vertical angles comprising a telescopic sighting means, a support including a horizontal shaft for mounting said telescopic sighting means for free rotation thereon, a liquid-tight cylindrical casing including means on said casing for fixedly securing said horizontal shaft thereto, a central shaft supported within said casing in axial alignment with said horizontal shaft, a first sector-shaped member having opposing planar surfaces eccentrically rigidly secured to said central shaft, a pair of similar sector-shaped segments having opposing planar surfaces, each sector-shaped segment mounted on said central shaft by a suspension means for free rotation about said central shaft in mutuallly spaced relation with one planar surface of said first sector-shaped member, said suspension means including leaf springs arranged perpendicularly to the axis of said central shaft, the plane surfaces of said leaf springs being perpendicular to the axis of said central shaft and having one end of each leaf spring secured to said central shaft and the opposite end of each leaf spring secured adjacent the apex of each sector-shaped segment below the center of rotation thereof, each of said leaf springs composed of an upper and lower portion proportioned in length relative to the total effective length of said leaf springs by the location of said center of rotation, said center of rotation being located at the point of intersection of tangents drawn to said upper and lower portions when in a flexed condition, means joining said pair of segments adjacent the peripheries thereof in registering relation, an aperture in said first sector-shaped member to accommodate said joining means and to limit the motion of said sector-shaped segments relative to said first sector-shaped member, a transparent graduated dial plate secured to an outer surface of one of said pair of sector-shaped segments adjacent an outer wall of said casing in a predetermined position normal to the axis of said central shaft, means for observing the graduations on said dial plate externally of said casing, a vibration damping medium filling said casing whereby upon simultaneous rotation of said telescopic sighting means and said casing, said first sector-shaped member maintains said central shaft in a predetermined position to permit said sector-shaped segments to maintain said graduated dial plate in a predetermined position to render accurate vertical angle measurements.

7. A device for measuring vertical angles comprising a telescopic sighting means, a support including a horizontal shaft for mounting said telescopic sighting means for free rotation thereon, a liquid-tight cylindrical casing including means on said casing for fixedly securing said horizontal shaft thereto, a central shaft supported within said casing in axial alignment with said horizontal shaft, a first sector-shaped member having opposing planar surfaces eccentrically rigidly secured to said central shaft, a pair of similar sector-shaped segments having opposing planar surfaces, each sector-shaped segment mounted on said central shaft by a suspension means for free rotation about said central shaft in mutually spaced relation with one planar surface of said first sector-shaped member, said suspension means including flexible wires having one end of each of said wires secured to said central shaft perpendicular to the axis thereof and the opposite end of each wire secured adjacent the apex of each sector-shaped segment below the center of rotation thereof, each flexible wire composed of an upper and lower portion proportioned in length relative to the total effective length of said wires by the location of said center of rotation, said center of rotation being located at the point of intersection of tangents drawn to said upper and lower portions when in a flexed condition, means joining said pair of segments adjacent the peripheries thereof in registering relation, an aperture in said first sector-shaped member to accommodate said joining means and to limit the motion of said sector-shaped segments relative to said first sector-shaped member, a transparent graduated dial plate secured to an outer surface of one of said pair of sector-shaped segments adjacent an outer wall of said casing in a predetermined position normal to the axis of said central shaft, means for observing the graduations on said dial plate externally of said casing, a vibration damping medium filling said casing whereby upon simultaneous rotation of said telescopic sighting means and said casing, said first sector-shaped member maintains said central shaft in a predetermined position to permit said sector-shaped segments to maintain said graduated dial plate in a predetermined position to render accurate vertical angle measurements.

8. In combination with an optical instrument including a sighting means and a support for rotatably mounting said sighting means, a vertically disposed flexible suspension member fixedly secured at one end thereof to said support, a mass secured to the opposite free end of said flexible suspension member, said flexible suspension member having an oupper and lower portion proportioned in length to the total effective length of said flexible suspension member between the fixedly secured end and said mass by the location of a center of rotation therebetween, said center of rotation being located at the point of intersection of tangents drawn to said upper and lower portions when in a flexed condition, said point of intersection being coincident with the center of the support for said sighting means.

9. In an optical instrument including a sighting tube having a reticle therein having an intersection coincident with the optical axis through said sighting tube and a horizontal support for said sighting tube having a longitudinal axis normal to the optical axis through said sighting tube, a vertically disposed flexible suspension member fixedly secured at one end thereof to said horizontal support, a mass secured to the opposite free end of said flexible suspension member, said flexible suspension member having an upper and lower portion proportioned in length to the total effective length of said flexible suspension member between the fixedly secured end and said mass by the location of a center or rotation therebetween, said center of rotation being located at the point of intersection of tangents drawn to said upper and lower portions when in a flexed condition, said point of intersection being coincident with the center of said horizontal support.

10. The structure of claim 8 wherein the length of said flexible suspension member between said fixed end and said mass includes an effective length equal to $$\sqrt{\frac{6EI}{P}}$$

wherein E is the modulus of elasticity of the material of the flexible suspension member, I is the moment of inertia about the longer axis of the cross-section of the flexible suspension member, and P is the magnitude of the weight suspended by the flexible suspension member at the free end thereof whereby when said upper portion is rotated by said support the lower portion adjacent said mass is maintained in a vertical position.

References Cited in the file of this patent

UNITED STATES PATENTS

| | | |
|---|---|---|
| 9,722 | Chandler | May 17, 1853 |
| 328,881 | Deckard | Oct. 20, 1885 |
| 369,750 | Spranger | Sept. 13, 1887 |
| 689,323 | Quimby | Dec. 17, 1901 |
| 975,682 | Ferber | Nov. 15, 1910 |
| 1,203,012 | Klass | Oct. 31, 1916 |